UNITED STATES PATENT OFFICE.

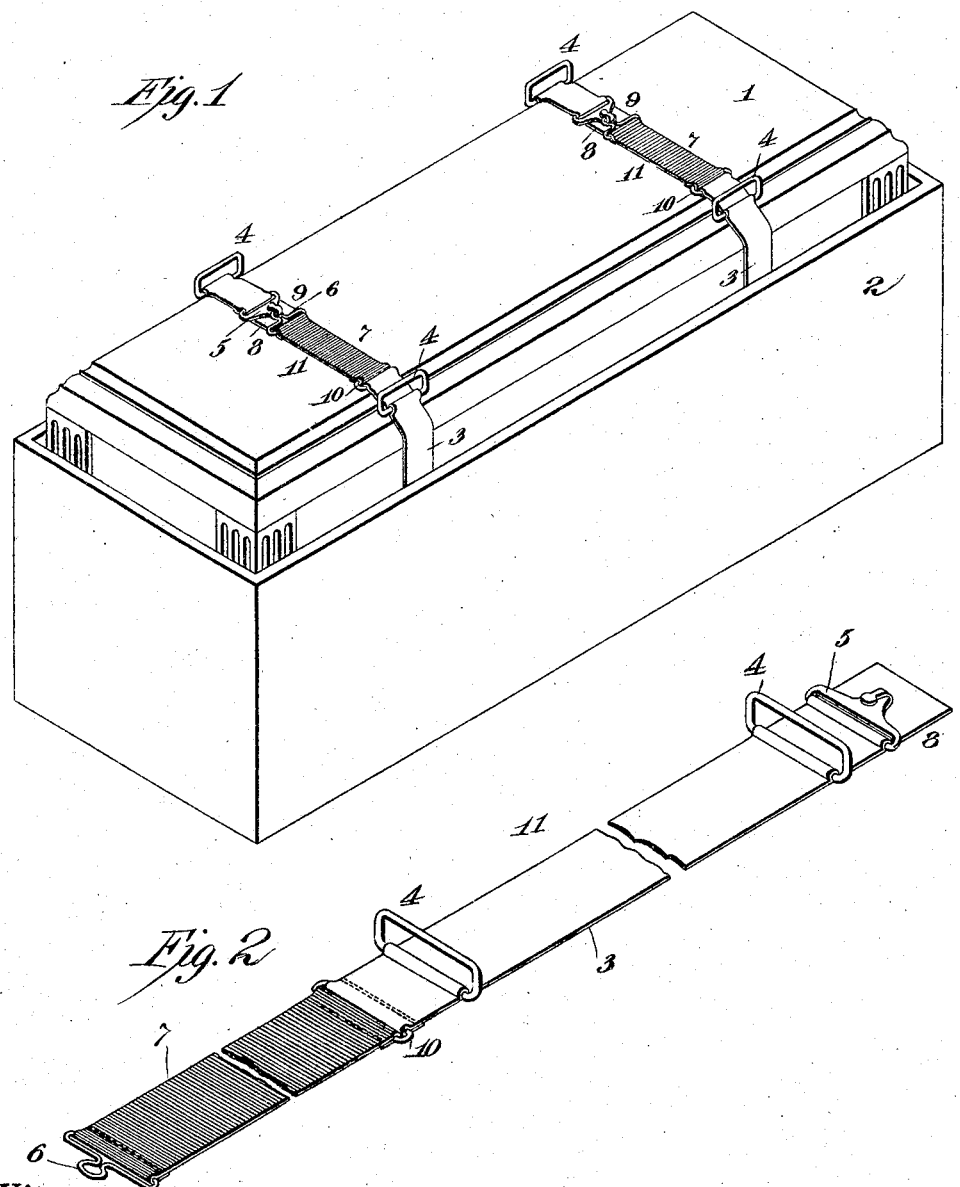

EDWARD R. TAYLOR, OF TRENTON, NEW JERSEY.

CASKET-SHIPPING STRAP.

No. 858,680.  Specification of Letters Patent.  Patented July 2, 1907.

Application filed May 18, 1906. Serial No. 317,517.

*To all whom it may concern:*

Be it known that I, EDWARD R. TAYLOR, a citizen of the United States, residing in Trenton, county of Mercer, and State of New Jersey, have invented a certain new and useful Improvement in Casket - Shipping Straps, of which the following is a specification.

The object I have in view is the production of a device for lifting caskets in and out of shipping cases or boxes, which will be simple and cheap to manufacture, which can be applied to caskets of different sizes, and by means of which caskets can be handled with greater facility than has heretofore been possible.

I attain these objects by the mechanism illustrated in the accompanying drawings, in which Figure 1 is a perspective view of a casket and shipping box showing one embodiment of my invention in use, and Fig. 2 is a perspective view of one of the shipping straps in accordance with my invention.

In both of the same views, like parts are designated by the same reference characters.

In the accompanying drawings, 1 represents the casket and 2 the shipping box.

In carrying out my invention, I provide a strap 11, which surrounds the casket. The strap is formed of a section 3, of non-elastic webbing, or some other suitable material, and a section 7 of elastic material. Near the extremities of the non-elastic webbing are attached handles 4—4. Near one extremity and beyond one of the handles is attached one member 5 of a clasp or clip 9. To the other extremity of the non-elastic webbing is attached a portion of elastic webbing 7, which constitutes the remainder of the strap 11. To the extremity of this elastic webbing is attached the other member 6 of the clasp 9. As shown in the drawings, the member 5 is a hook member, and the member 6 an eye member, but it is obvious that the two members may be reversed in their position, and any other form of clasp may be used, if desired. An extension 8 of the non-elastic webbing lies under the clasp member 5, so that the clasp will not injure the polished surface of the casket, nor scratch the same. The elastic and non-elastic webbings are shown as permanently connected together by means of an eye 10.

In use, the non-elastic webbing is adapted to be placed around the sides and bottom of the casket, and the elastic webbing stretched across the top, the two members of the clasp being connected together so that the entire strap 11 will encompass the casket. When in position, the handles 4—4 should rest upon the edges of the casket in such a position that they may be readily grasped, and the casket raised or lowered. The webbing 7 permits the strap to snugly engage with the walls, the top and bottom of the casket, and yet permits the hooked clasp to be fastened or unfastened. The elastic portion of the strap also permits the application of the device to caskets of different sizes, without requiring adjustment. When lifting or lowering the casket, it is supported by means of the non-elastic webbing, no strain being upon the elastic portion.

In accordance with the patent statutes, I have described the principles of operation of my invention, together with the apparatus which I now consider to be the best embodiment thereof; but I desire it understood that the apparatus shown is only illustrative, and that the invention may be carried out by other means which come within the limits of the claims.

Having now described my invention, what I claim as new and desire to secure by Letters Patent, is:

1. A casket shipping strap having a non-elastic portion with lifting handles adjacent to the extremities thereof, and an elastic portion connecting the extremities of the non-elastic portion, and a clasp for securing the ends together to hold the strap upon the casket.

2. In a casket shipping strap, the combination with a non-elastic portion, handles adjacent to the extremities thereof, and a clasp member beyond one of said handles; an elastic portion secured to the other extremity of the strap, and carrying the other clasp member, a portion of the non-elastic strap extending under the clasp so as to prevent the clasp from coming into contact with the casket.

3. In a casket shipping strap, the combination with a non-elastic portion, handles adjacent to the extremities thereof, and a hook member of a clasp beyond one of the said handles, an elastic portion secured to the other extremity of the strap, and carrying an eye member forming the other element of the clasp member, a portion of the non-elastic strap extending under the hook-member so as to prevent the clasp coming in contact with the casket.

This specification signed and witnessed this 15th day of May, 1906.

EDWARD R. TAYLOR.

Witnesses:
E. S. PARKINSON,
EDWARD W. LEE.